UNITED STATES PATENT OFFICE.

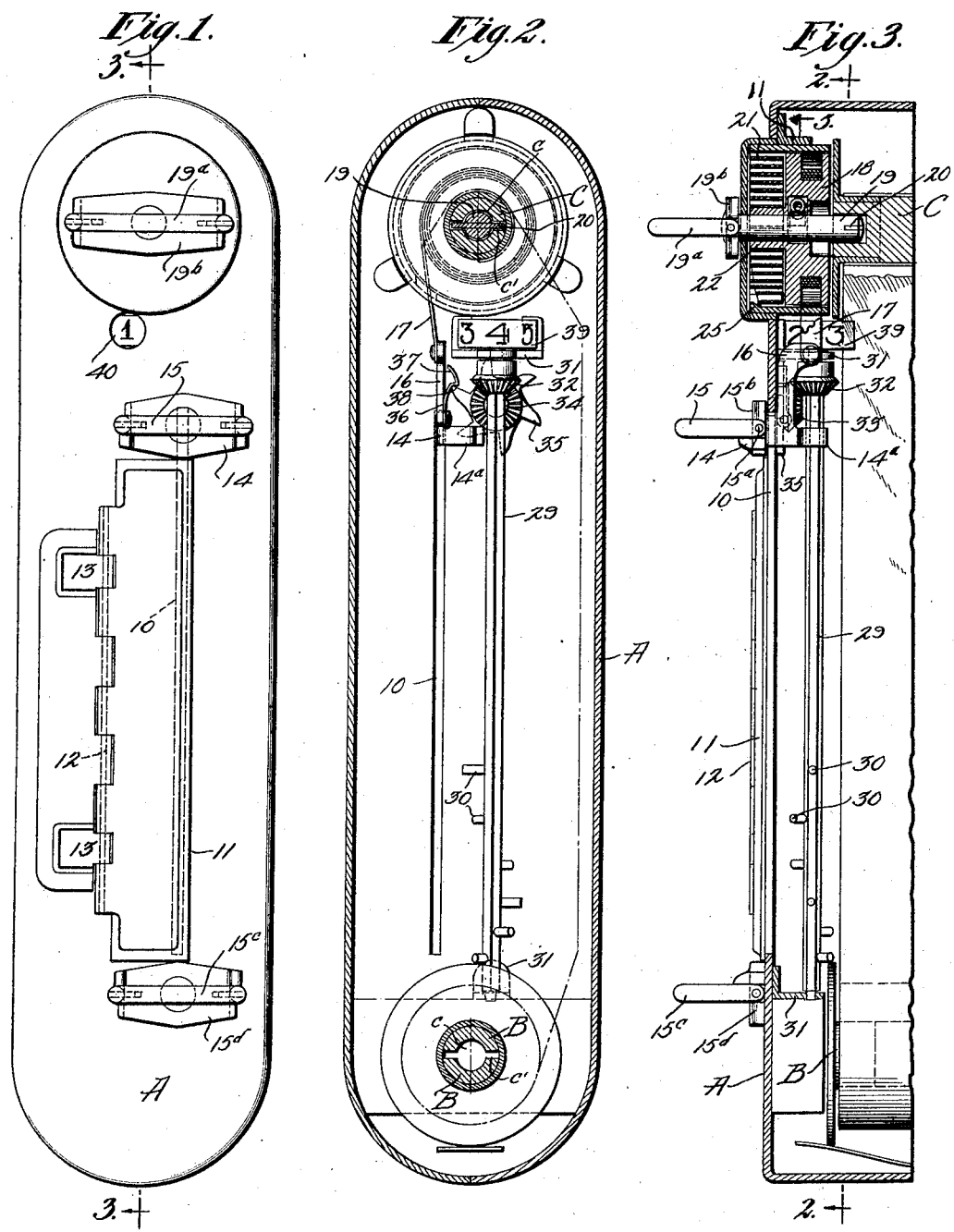

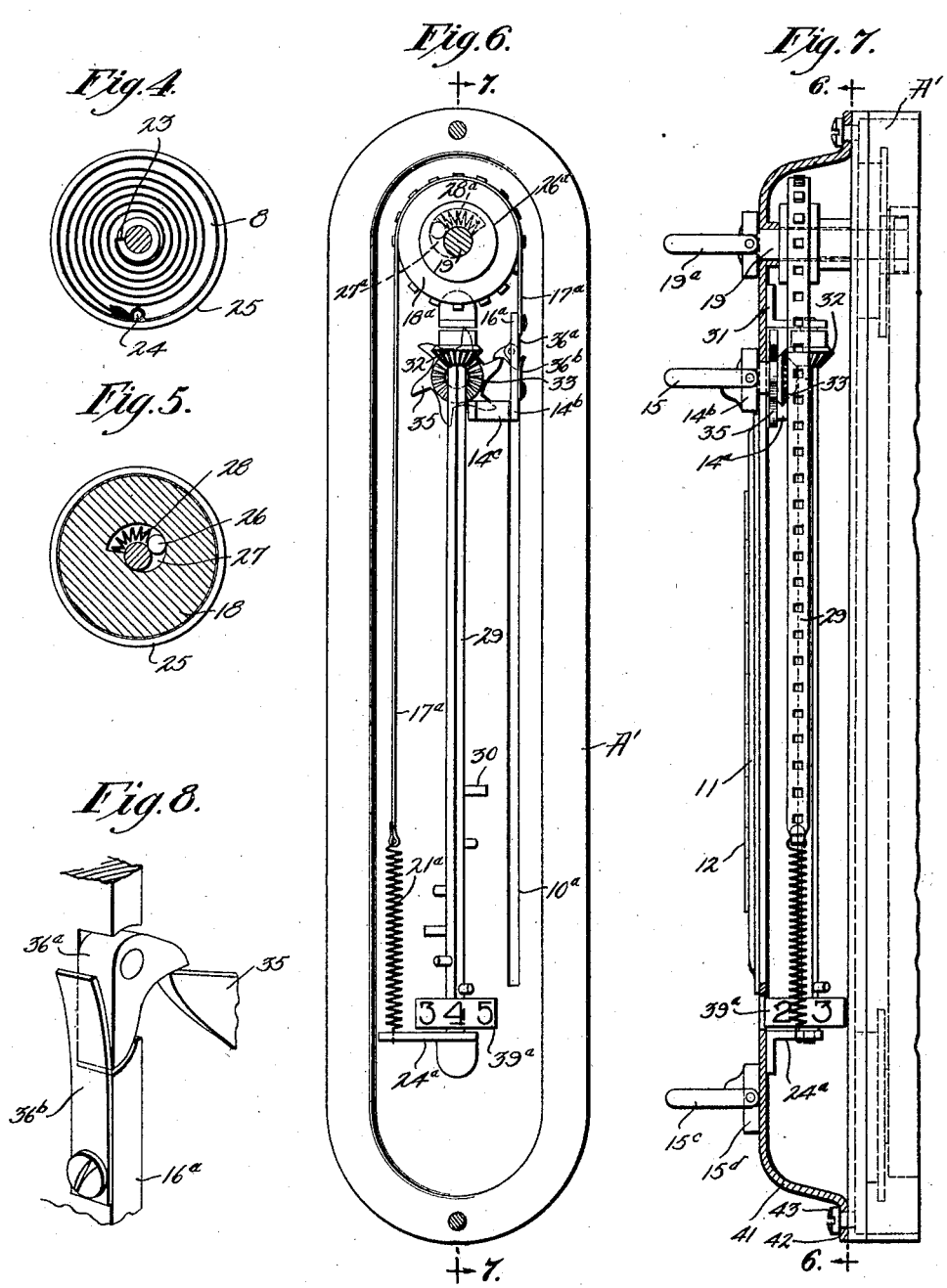

HIRAM HYATT BERRY, OF NEW YORK, N. Y.

FILM-WINDING MEANS FOR CAMERAS.

1,394,401.  Specification of Letters Patent.  Patented Oct. 18, 1921.

Application filed January 28, 1920. Serial No. 354,540.

*To all whom it may concern:*

Be it known that I, HIRAM HYATT BERRY, a citizen of the United States, and a resident of the city of New York, borough of the Bronx, in the county of Bronx and State of New York, have invented a new and Improved Film-Winding Means for Cameras, of which the following is a description.

My invention relates to cameras and more particularly to cameras employing roll films.

Objects of the invention are to provide novel means for causing the turning of the winding spool by a slidable actuating device accessible from the exterior as well as means to vary the winding action to accord with the increasing diameter of the spool as the film is wound thereon.

The above and other objects are attained by the novel features and combination of parts hereinafter particularly described and defined in the claims.

Reference is to be had to the accompanying drawings forming a part of this specification, it being understood that the drawing is merely illustrative of practical examples of the invention.

Figure 1 is an end view of the camera embodying my invention;

Fig. 2 is a transverse vertical section on the line 2—2, Fig. 3;

Fig. 3 is a longitudinal vertical section of one side of the camera;

Fig. 4 is a detail view of the winding drum and its casing, the cover of said casing being removed;

Fig. 5 is a section on the line 5—5, Fig. 3;

Fig. 6 is a view similar to Fig. 2 but illustrating a modification;

Fig. 7 is a partly sectional side elevation of the camera, the section being taken on the line 7—7, Fig. 6;

Fig. 8 is a perspective view illustrating a detail employed in the construction illustrated in Figs. 6 and 7 and to be hereinafter referred to.

In the drawings A indicates a camera which in general may be of any approved construction, employing a spool B to receive the rolled film to be exposed and a second spool C, on which the film may be wound following successive exposures.

In a side of the camera casing I provide a slot 10 and this may in practice be protected by any suitable means, there being indicated a cover plate 11 hinged as at 12 to the camera casing at the exterior and subject to springs 13 tending to automatically maintain the cover in position closing the slot 10. A slide 14 is movable in the slot 10 and at the exterior of the camera is provided with a suitable handle or other member to be gripped, there being shown a handle 15 pivoted as at $15^a$ to the external portion of the slide, said external portion presenting a shoulder $15^b$ limiting the vertical movement of the handle, the latter normally dropping to a position close to the camera. A similar gripping device $15^c$ is pivoted to any suitable fixed member $15^d$ on the camera adjacent to one end of the slot 10 so that a finger and thumb of the operator may grasp the elements 15, $15^c$ for drawing the former toward the latter in the moving of the slide 14. The slide 14 within the camera has an arm 16 to which is secured one end of a tape 17, said tape winding on a drum 18 loose on a spindle 19, said spindle being adapted to be detachably interlocked with the spool C on which the film is to be wound, any means employed in similar devices in cameras being availed of for the purpose, said spindle in the illustrated example being receivable at its inner end in an axial recess $c$ in roller C and having lateral keys 20 to engage in slots $c'$ of the spool. The spool B similarly is formed with a recess $c$ and slots $c'$, so that said spool when the film is unwound therefrom may be substituted for the spool C and receive the spindle 19. The spindle 19 has any suitable handle, there being shown a pivoted grip $19^a$ similar to the grips 15, $15^c$ and pivoted to a head $19^b$ of said spindle. A winding spring 21 is provided in the form of a flat coil about a hub extension 22 of drum 18, said spring being secured at its inner end to said hub as by an inturned end of the spring being entered in a transverse slot of the hub as indicated at 23, Fig. 4. The outer end of the spring is suitably fastened as at 24 to a fixed casing 25 housing said spring and drum. A suitable clutch is provided permitting the drum 18 to turn freely on the spindle 19 in one direction and to cause the said drum to grip said spindle and turn the latter and the spool C when the drum is turned in the oposite direction, there bing shown a ball clutch 26 in a recess 27 in drum 18, a spring 28 acting on said ball and normally tending to move it to the clutching position.

With the described arrangement when the slide 14 is moved in the slot 10, in the direction away from the film spool C the drum 18 will turn and will clutch and turn the spindle 19 and spool C in response to the pull exerted by the slide and the flexible tape 17. The turning of the drum will place the spring 21 under tension and upon the slide 14 being released said spring will react to turn the drum in the reverse direction and restore the spring, the clutch slipping in this movement by the ball clutch releasing the spindle 19, thereby leaving the film spool and film in the position to which they were moved by the slide and tape.

It will be observed that the slot 10 and therefore the movements of the slide 14 terminate within the plane of the camera, so that no member will be presented extending beyond the camera casing which would afford an obstruction or be likely to engage other objects.

In order to vary the movement of the slide 14 to accord with the increasing diameter of the spool C with the film thereon, I provide for a variable stop means to be interposed in the path of the slide and operable by the latter, said means comprising a spindle 29, having a spiral series of stop projections 30 thereon. Said spindle has bearings in suitable members such as brackets 31 on the camera casing and at one end has a bevel pinion 32 meshing with a similar pinion 33 on a stud shaft 34 on said casing. In fixed relation to the pinion 33 is a wheel 35 presenting a plurality of arms here shown as a star wheel, said arms being adapted to be engaged in succession by a suitable trip movable with the slide 14, there being shown in Figs. 2 and 3 a spring pawl 36 secured to the arm 16 of the slide. The beveled end 37 of pawl 36 is adapted to freely slip by the wheel 35 in the return movement of the slide in response to the spring 21, there being a shoulder 38 presented by said pawl adapted to engage an arm of the wheel 35 upon a movement of the slide 14 away from the spool C in opposition to said spring. Thus, the wheel 35 will be given intermittent turning movement with each movement of the slide 14 and thereby a different stop 30 will be presented in the path of an arm $14^a$ on said slide, thereby limiting the movement of the latter, the movement reducing with each film exposure. In the illustrated example six stops 30 are provided to adapt it to a camera having a rolled film affording six exposures.

I provide also a register viewable from the exterior of the camera to indicate the number of exposures made; said means consists of an index wheel 39 turning in unison with the spindle 29. In the form in Figs. 1 and 2, the index wheel, 39, is secured to that end of the spindle adjacent to the wheel 35, but it may be secured to the opposite end as will appear. The wheel 35 is viewable through a side opening 40 in the adjacent end of the camera casing.

In the form shown in Figs. 6 to 8 the camera A' has a slot $10^a$ corresponding with the slot 10 and a slide $14^a$ operating said slot. To an arm $16^a$ on said slide is secured a flexible element $17^a$ here shown as a strap perforated to run over and engage a sprocket drum $18^a$, the other end of said strap being secured to a retractile spring $21^a$, the opposite end of which is secured to any fixed member, such as a bracket $24^a$ in the camera casing. Thus, the spring $21^a$ will be tensioned by a downward movement of the slide $14^b$ and will return said slide to its initial position after movement thereof. A spring pawl $36^a$ is pivoted in the arm $16^a$ in position to engage an arm of the star wheel 35. A plate spring $36^b$ bears against the pawl $36^a$ tending to maintain the same in position to engage the wheel 35 upon a downward movement of the slide. An arm $14^c$ is provided on the slide $14^b$ corresponding with the arm $14^a$ to engage the stop 30 presented in the path thereof. The drum $18^a$ has a ball clutch $26^a$ operating in a cam recess $27^a$ corresponding with the recess 27 and acted upon by a spring $28^a$ so that the drum may turn independently of spindle 19 in one direction and be caused to clutch said spindle when the drum turns in the opposite direction. The index wheel $39^a$ in Figs. 6 and 7 is shown on the spindle 29 at the opposite end from that on which the wheel is shown in Figs. 1 and 3. Either end may be utilized for carrying the index wheel. Strap $17^a$ is of flexible metal.

It will be observed that the embodiment of the invention shown in Figs. 6 to 8 is in a form to make it attachable to a camera after it has left the factory for which purpose the described mechanism is all carried by a plate or casing 41 offset to present an edge flange 42 adapted to lie against the camera at a side thereof and be suitably fastened as by screws 43.

I would state in conclusion that while the illustrated examples constitute practical embodiments of my invention, I do not limit myself strictly to the mechanical details herein illustrated since manifestly the same can be considerably varied without departure from the spirit of the invention as defined in the appended claims.

Having thus described my invention, I claim:

1. In a winding means for cameras, a slide adapted to be mounted to have guided movement on a camera, means to turn the winding spool of the camera by said slide, a spindle, means to turn said spindle by said slide, and a spiral series of stop projections on said spindle adapted to arrest the slide in various positions according to the particular stop presented in the path of the slide.

2. In a winding means for cameras, a slide adapted to be mounted to have guided movement on a camera, means to turn the winding spool of the camera by said slide, a spindle, a spiral series of stop projections on the spindle adapted to be presented by the turning of the spindle into the path of the slide to limit its movement, a multi-armed drive element in position that its arms will be presented in the path of the slide, a resilient pawl carried by said slide and adapted in one direction to engage said wheel, and to slip by the wheel when the slide moves in the opposite direction, and means to drive said spindle with the turning of said drive element.

3. In a winding means for cameras, a slide adapted to be mounted to have guided movement on a camera, means to turn the winding spool of the camera by said slide, a spindle, means to turn said spindle by said slide, and a spiral series of stop projections on said spindle adapted to arrest the slide in various positions according to the particular stop presented in the path of the slide; together with an indicator turnable in unison with the spindle to register the successive movements thereof and indicate the particular stop presented to the slide.

HIRAM HYATT BERRY.